(12) United States Patent
Morris et al.

(10) Patent No.: US 6,231,758 B1
(45) Date of Patent: *May 15, 2001

(54) CURB-INLET STORM DRAIN SYSTEMS FOR FILTERING TRASH AND HYDROCARBONS

(75) Inventors: James F. Morris; Stephen C. Stelpstra, both of Tucson, AZ (US)

(73) Assignee: Abtech Industries, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/644,137

(22) Filed: Aug. 22, 2000

Related U.S. Application Data

(63) Continuation of application No. 09/252,041, filed on Feb. 17, 1999, now Pat. No. 6,106,707.
(60) Provisional application No. 60/075,280, filed on Feb. 18, 1998.

(51) Int. Cl.[7] .................. E03F 5/14; B01D 39/00
(52) U.S. Cl. .................. 210/163; 210/337; 210/502.1; 210/503; 210/908; 404/4
(58) Field of Search .................. 210/163–166, 210/170, 337, 502.1, 503, 908; 404/4

(56) References Cited

U.S. PATENT DOCUMENTS

| Re. 29,996 | 5/1979 | Jordan et al. .................. 210/281 |
|---|---|---|
| 248,559 | 10/1881 | Jackson . |
| 425,641 | 4/1890 | Van De Walle . |
| 530,816 | 12/1894 | Wright . |
| 543,740 | 7/1895 | Kuhns . |
| 1,032,700 | 7/1912 | Pickett . |
| 1,164,527 | 12/1915 | Kelly, Jr. . |
| 1,274,227 | 7/1918 | Woodson . |
| 1,471,819 | 10/1923 | Bauschard . |
| 1,935,642 | 11/1933 | Laughlin .................. 210/45 |

(List continued on next page.)

FOREIGN PATENT DOCUMENTS

| CH-613245 | 9/1979 | (CH) . |
|---|---|---|
| 7109 | 10/1900 | (GB) . |
| 13514 | 7/1983 | (GB) . |
| 4-371203 | 12/1992 | (JP) . |

OTHER PUBLICATIONS

Fam, Sami, Michael K. Stenstron, and Gary Silverman, "Hydrocarbons in Urban Runoff," *Journal of Environmental Engineering*, vol. 113, No. 5, Oct. 1987, pp. 1032–1046.

"Block Copolymers," *Polymer Handbook*, p. 34 (Wiley, 3rd Edition 1989).

(List continued on next page.)

*Primary Examiner*—Duane Smith
*Assistant Examiner*—Fred Prince
(74) *Attorney, Agent, or Firm*—Louis J. Hoffman

(57) ABSTRACT

A modular insert for curb-inlet storm drains creates a composite collection system for trash and for oil or other hydrocarbons and related chemicals. A hopper contains a multitude of irregular, macroscopic fragments of a hydrophobic, compliant, oil-absorbent, copolymer material having high surface area. Preferably, the material is formed with a binder in a novel extrusion process. The fragments absorb and retain permanently a high quantity of oil and other chemicals passing through the hopper, while permitting a high water flow-through rate. The fragments are held in place by a removable bottom plate, which allows replacement of the filtering fragments, and an internal basket. Trash and debris are collected in the internal basket. The hopper is configured to be suspended in a storm drain adjacent to a curb inlet on a bracket and can be installed or serviced through a conventional manhole entry. The hopper has a side cutout that permit lateral overflow from one of the modular units to an adjacent one.

14 Claims, 3 Drawing Sheets

U.S. PATENT DOCUMENTS

| | | | |
|---|---|---|---|
| 1,972,513 | 9/1934 | Drehmann | 182/31 |
| 2,102,310 | 12/1937 | Egan | 182/2 |
| 2,182,795 | 12/1939 | Day | 182/31 |
| 2,467,021 | 4/1949 | Fischer | 210/44 |
| 2,557,079 | 6/1951 | Cutri | 294/77 |
| 2,813,745 | 11/1957 | Frieder et al. | 294/77 |
| 2,889,928 | 6/1959 | Sisk | 210/163 |
| 3,147,216 | 9/1964 | Oemler | 210/693 |
| 3,221,888 | 12/1965 | Muller | 210/333 |
| 3,246,582 | 4/1966 | Wade | 94/33 |
| 3,324,630 | 6/1967 | Teller et al. | 55/90 |
| 3,415,745 | 12/1968 | Isaacson | 210/54 |
| 3,494,862 | 2/1970 | Horowitz | 210/693 |
| 3,518,183 | 6/1970 | Evans | 210/40 |
| 3,536,616 | 10/1970 | Kondoh et al. | 210/693 |
| 3,537,587 | 11/1970 | Kain | 210/242 |
| 3,538,020 | 11/1970 | Heskett et al. | 210/496 |
| 3,539,013 | 11/1970 | Smith | 210/242 |
| 3,565,257 | 2/1971 | Cavalieri | 210/242 |
| 3,567,660 | 3/1971 | Winkler | 260/2.3 |
| 3,594,335 | 7/1971 | Schultz et al. | 260/2.5 |
| 3,607,741 | 9/1971 | Sohnius | 210/242.4 |
| 3,607,793 | 9/1971 | Mahlman | 260/93.7 |
| 3,617,565 | 11/1971 | Fahlvik | 210/691 |
| 3,617,566 | 11/1971 | Oshima et al. | 210/242.4 |
| 3,667,235 | 6/1972 | Preus et al. | 61/1 |
| 3,667,608 | 6/1972 | Burroughs et al. | 210/242 |
| 3,679,058 | 7/1972 | Smith | 210/242 |
| 3,681,237 | 8/1972 | Orban | 210/680 |
| 3,702,657 | 11/1972 | Cunningham et al. | 210/242 |
| 3,713,539 | 1/1973 | Thompson et al. | 210/164 |
| 3,739,913 | 6/1973 | Bogosian | 210/924 |
| 3,756,948 | 9/1973 | Weinberg | 210/693 |
| 3,783,621 | 1/1974 | Preus et al. | 61/1 F |
| 3,800,950 | 4/1974 | Hess et al. | 210/242.4 |
| 3,831,760 | 8/1974 | Economy et al. | 210/242 |
| 3,837,494 | 9/1974 | Stevenson | 210/259 |
| 3,868,322 | 2/1975 | Orloff | 210/108 |
| 3,888,766 | 6/1975 | DeYoung | 210/693 |
| 3,915,859 | 10/1975 | Sundin et al. | 210/104 |
| 3,916,969 | 11/1975 | Auerbach et al. | 152/354 |
| 3,923,472 | 12/1975 | Martinez et al. | 44/50 |
| 3,929,631 | 12/1975 | Winkler | 210/36 |
| 4,002,177 | 1/1977 | Rainer et al. | 131/10 R |
| 4,031,839 | 6/1977 | Pedone | 114/270 |
| 4,039,489 | 8/1977 | Fletcher et al. | 210/924 |
| 4,052,306 | 10/1977 | Schwartz et al. | 210/242 S |
| 4,060,487 | 11/1977 | Samsel | 210/923 |
| 4,061,807 | 12/1977 | Shaler et al. | 210/502 |
| 4,065,923 | 1/1978 | Preus | 61/1 F |
| 4,070,287 | 1/1978 | Wiegand et al. | 210/693 |
| 4,084,380 | 4/1978 | Hallhagen | 61/1 F |
| 4,099,619 | 7/1978 | Hudler et al. | 206/524.1 |
| 4,102,783 | 7/1978 | Zenno et al. | 210/36 |
| 4,111,813 | 9/1978 | Preus | 210/282 |
| 4,206,080 | 6/1980 | Sato et al. | 252/430 |
| 4,207,378 | 6/1980 | Klein | 428/402 |
| 4,248,758 | 2/1981 | Wright | 260/33.6 |
| 4,261,823 | 4/1981 | Gallagher et al. | 210/164 |
| 4,264,444 | 4/1981 | Bronnec | 210/923 |
| 4,332,854 | 6/1982 | Parker | 210/924 |
| 4,366,067 | 12/1982 | Golding et al. | 210/67 I |
| 4,401,475 | 8/1983 | Eriksson et al. | 210/924 |
| 4,419,232 | 12/1983 | Arntyr et al. | 210/164 |
| 4,420,400 | 12/1983 | Weitzen | 210/710 |
| 4,427,157 | 1/1984 | Klein | 210/160 |
| 4,429,065 | 1/1984 | Gancy | 523/223 |
| 4,439,324 | 3/1984 | Crotti | 210/924 |
| 4,454,039 | 6/1984 | McCoy | 210/164 |
| 4,497,663 | 2/1985 | Fisher et al. | 134/4 |
| 4,497,712 | 2/1985 | Crowling | 210/242.4 |
| 4,519,431 | 5/1985 | Yoshimura et al. | 152/209 R |
| 4,519,918 | 5/1985 | Ericsson et al. | 210/680 |
| 4,560,718 | 12/1985 | Ritchey | 524/13 |
| 4,592,690 | 6/1986 | Busch | 413/19 |
| 4,594,157 | 6/1986 | McGowan | 210/163 |
| 4,640,730 | 2/1987 | Streets et al. | 156/334 |
| 4,672,781 | 6/1987 | Pichon | 52/94 |
| 4,737,394 | 4/1988 | Zafiroglu | 210/694 |
| 4,740,435 | 4/1988 | Markin et al. | 429/174 |
| 4,776,722 | 10/1988 | Gaudin | 405/25 |
| 4,801,386 | 1/1989 | Sugimori et al. | 210/680 |
| 4,919,820 | 4/1990 | Lafay et al. | 210/671 |
| 4,929,349 | 5/1990 | Beckman | 210/151 |
| 4,941,978 | 7/1990 | Gabrick | 210/693 |
| 4,965,129 | 10/1990 | Bair et al. | 210/924 |
| 4,980,229 | 12/1990 | Park et al. | 428/327 |
| 5,009,790 | 4/1991 | Bustamante et al. | 210/242.4 |
| 5,032,640 | 7/1991 | Fachini | 524/426 |
| 5,037,541 | 8/1991 | Ruey-Jang et al. | 210/141 |
| 5,071,564 | 12/1991 | Stein et al. | 210/924 |
| 5,075,014 | 12/1991 | Sullivan | 210/776 |
| 5,104,548 | 4/1992 | Gabrick | 210/680 |
| 5,133,619 | 7/1992 | Murfae et al. | 404/4 |
| 5,135,578 | 8/1992 | Billings | 210/924 |
| 5,135,660 | 8/1992 | Chromecek et al. | 210/671 |
| 5,159,016 | 10/1992 | Inoue et al. | 525/92 |
| 5,165,821 | 11/1992 | Fischer et al. | 405/63 |
| 5,173,182 | 12/1992 | Debellian | 210/170 |
| 5,179,611 | 1/1993 | Umeda et al. | 385/110 |
| 5,181,802 | 1/1993 | Thengs et al. | 405/70 |
| 5,186,831 | 2/1993 | DePetris | 210/924 |
| 5,207,901 | 5/1993 | Ravagnan | 210/173 |
| 5,211,858 | 5/1993 | Dovan et al. | 252/8.551 |
| 5,223,154 | 6/1993 | MacPherson, Jr. et al. | 210/790 |
| 5,227,072 | 7/1993 | Brinkley | 210/924 |
| 5,232,587 | 8/1993 | Hegemier et al. | 210/162 |
| 5,248,729 | 9/1993 | Inoue et al. | 525/92 |
| 5,252,215 | 10/1993 | McFarlane et al. | 210/69.1 |
| 5,256,226 | 10/1993 | Marzola et al. | 156/95 |
| 5,278,217 | 1/1994 | Umeda et al. | 524/394 |
| 5,281,463 | 1/1994 | Cotton | 428/126 |
| 5,284,580 | 2/1994 | Shyh | 210/163 |
| 5,297,367 | 3/1994 | Sainz | 52/12 |
| 5,304,311 | 4/1994 | Codiglia | 210/693 |
| 5,324,429 | 6/1994 | Holland | 210/484 |
| 5,330,651 | 7/1994 | Robertson | 210/617 |
| 5,360,548 | 11/1994 | Stein et al. | 210/693 |
| 5,364,535 | 11/1994 | Buckalew | 210/671 |
| 5,374,600 | 12/1994 | Hozumi et al. | 502/402 |
| 5,391,295 | * 2/1995 | Wilcox et al. | . |
| 5,403,474 | 4/1995 | Emery | 210/163 |
| 5,405,539 | 4/1995 | Schneider | 210/747 |
| 5,407,575 | 4/1995 | Vinsonhaler | 210/924 |
| 5,414,029 | 5/1995 | Lemoine et al. | 524/60 |
| 5,423,985 | 6/1995 | Addeo et al. | 210/924 |
| 5,428,085 | 6/1995 | Burel et al. | 524/59 |
| 5,432,000 | 7/1995 | Young Sr., et al. | 428/372 |
| 5,439,590 | 8/1995 | Steffan | 210/616 |
| 5,468,539 | 11/1995 | Crivelli | 428/141 |
| 5,480,254 | 1/1996 | Autry et al. | 404/2 |
| 5,496,865 | 3/1996 | Heese et al. | 521/79 |
| 5,511,904 | 4/1996 | Van Egmond | 405/52 |
| 5,516,845 | 5/1996 | Heese et al. | 525/193 |
| 5,573,349 | 11/1996 | Paoluccio | 405/52 |
| 5,575,925 | 11/1996 | Logue, Jr. | 210/747 |
| 5,624,576 | 4/1997 | Lenhart et al. | 210/767 |
| 5,632,889 | 5/1997 | Tharp | 210/165 |
| 5,641,847 | 6/1997 | Hozumi et al. | 526/328.5 |
| 5,679,246 | * 10/1997 | Wilcox et al. | . |
| 5,707,527 | 1/1998 | Knutson et al. | 210/660 |

| | | | |
|---|---|---|---|
| 5,712,358 | 1/1998 | Sojka | 526/323.2 |
| 5,720,574 | 2/1998 | Barella | 405/52 |
| 5,725,782 | 3/1998 | Chinn et al. | 210/767 |
| 5,733,445 | 3/1998 | Fanelli | 210/164 |
| 5,744,048 | 4/1998 | Stetler | 210/803 |
| 5,762,790 | 6/1998 | Zoeller | 210/238 |
| 5,767,060 | 6/1998 | Hanrahan | 210/502.1 |
| 5,788,849 | 8/1998 | Hutter, Jr. et al. | 210/163 |
| 5,820,762 | 10/1998 | Bamer et al. | 210/661 |
| 5,830,967 | 11/1998 | Sojka | 526/323.2 |
| 5,834,577 | 11/1998 | Sojka | 526/323.2 |
| 5,849,198 | 12/1998 | Sharpless | 210/693 |
| 5,863,440 | 1/1999 | Rink et al. | 210/693 |
| 5,869,555 | 2/1999 | Simmons et al. | 524/229 |
| 5,925,241 | 7/1999 | Aldridge et al. | 210/163 |
| 5,955,552 | 9/1999 | Sojka | 526/88 |
| 5,958,226 | 9/1999 | Fleischmann | 210/165 |
| 6,080,307 * | 6/2000 | Morris et al. . | |
| 6,099,723 | 8/2000 | Morris et al. | 210/170 |
| 6,106,707 * | 8/2000 | Morris et al. . | |
| 6,143,172 | 11/2000 | Rink et al. | 210/237 |

OTHER PUBLICATIONS

"Selection Criteria and Laboratory Evaluation of Oilspill Sorbents," *Environmental Protection Series*, Report EPS 3/SP/3, pp. 1–73 (Jun. 1991).

"Environment Spill Encapsulant Polymers," *IRM Chemical Form 550 product brochure* (Aug. 1993).

Rushefsky, "Old Tires Now Can Now Be Recycled," *Staten Island Advance* (Oct. 22, 1993).

"Titan Tech Attacks Tire Recycling Mess," *American Metal Market* (Oct. 26, 1993).

Alexander, "Bradley is Center of World Attention this Week" *Chickasha Daily Express* (Nov. 4, 1993).

"Business & Technology," *Solid Waste Report*, vol. 24, No. 43, p. 346 (Nov. 4, 1993).

"A Cooler Way to Melt Junked Tires," *Business Week* (Nov. 8, 1993).

Schulman, "A New Spin on Old Tires," *Newsweek* (Nov. 15, 1993).

"Titan Develops Tyre & Plastics Recycling," *HazNews* (Dec. 1993).

Kokish, "Titan Opens Pyrolysis Plants in South Korea," *Tire Business* (Dec. 13, 1993).

Metz, "N.M. Firm is Ready to Roll into the Tire Recycling Industry," *The Boston Globe* (Dec. 28, 1993).

"High–Tech Breakthroughs," *Boardroom Reports* (Jan. 1, 1994).

Kansas, "Catalysts and Beams Take Aim at Wastes," *The Wall Street Journal* (Jan. 21, 1994).

"Recycling News," *Green Alternatives,* vol. 4, No. 1 (Feb./Mar. 1994).

"Titan Technologies, Inc.," *Conservative Speculator* (Jun. 1994).

"Titan Technologies, Inc.," *Investor's NewsWire*, p. All (Sep. 9, 1994).

DiChristina, "Mired in Tires," *Popular Science* (Oct. 1994).

McDonagh, et al., "Handling and Disposal of Oil Waste from Oil Spills at Sea," paper presented at Long Beach Oil Spill Conference (Feb. 27, 1995).

Cassidy, "Titan Potential," *MoneyWorld* (Apr. 1995), pp. 18–21.

Titan Technologies, Inc. Investor's Booklet.

Materials re: King County Evaluation of Commercially Available Catch Basin Inserts for Treatment of Stormwater Runoff from Developed Sites, 10/95.

Shepp, David L., "Petroleum Hydrocarbon Concentrations Observed in Runoff from Discrete, Urbanized Automotive–Intensive Land Uses," *Watershed '96 Conference Proceedings*, pp. 220–223.

Imtech–Imbibitive Technologies Corporation product literature re "Imbiber Beads," 1993, 1996, 1997.

"HydroCartridges/Rubberizer" product literature 1994–1997.

Aqua Treatment Systems, Inc./"Absorbent W" product literature, 1996–1997.

"Innovative Stormwater Treatment Products & Services Guide," prepared for the Stormwater Technologies Trade Shows, Nov. 17 & 19, 1997 (discussing several products, some of which were commercially available before Jun. 1997).

Suntree Isles, Inc. "Curb Inlet Basket" product literature, 1995–96 (and see item A above).

Inventive Resources, Inc. "Water Decontamination" product literature (4/98 and see itemB above).

"Petrosorb HGPPL–1 Petroleum Product Spill Encapsulant," *Petrosorb product brochure* (source and date unknown).

"First in Thirst," *MatAsorb Industrial Sorbents product brochure* (sourch and date unknown).

Pacific Fluid System, Corp. "Linductor Oil Recovery and Bulk Transfer System Booklet".

"Fact Sheets, " *Team One USA Challenger Product Information.*

Fingas, Mervis F., et al. "The Newfoundland Offshore Burn Experiment–Nobe".

Buist, Ian A., et al. "In–Situ Burning of Alaska North Slope Emulsions".

Guenette, Chantal, et al. "Studies of In–Situ Burning of Emulsions in Norway".

Kristar Enterprises, Fossil Filter, brochure (9/96).

* cited by examiner

CURB-INLET STORM DRAIN SYSTEMS FOR FILTERING TRASH AND HYDROCARBONS

CROSS-REFERENCE TO RELATED APPLICATIONS

This application is a continuation of application Ser. No. 09/252,041, filed Feb. 17, 1999 now U.S. Pat. No. 6,106,707, which claims the benefit of provisional application Ser. No. 60/075,280, filed Feb. 18, 1998.

FIELD OF THE INVENTION

This invention is in the field of systems and methods for separating trash and hydrocarbons from water that passes into storm drains, such as runoff from city streets.

BACKGROUND OF THE INVENTION

A large volume of trash, including leaves, twigs, plastic or paper cups, cigarette butts, and wrappers, and the like, pass into storm drains adjacent to paved surfaces such as streets and parking lots, such as through curb inlets.

Larger spills of oil can also flow into storm drains, such as from loading docks, gas stations, and the like. In addition, quantities of oil or other hydrocarbons are frequently spilled on the ground and subsequent water flow, such as from rain, can cause the oil to flow into storm drains. This is referred to as "non-point-source pollution."

The volume of oil from non-point-source pollution in typical water runoff is surprisingly large. For example, a government study in one published article showed that storm water sampled from street sites contained an "event mean concentration" of 2.2 mg. of oil per liter of runoff water. Shepp, "Petroleum Hydrocarbon Concentrations Observed in Runoff from Discrete, Urbanized Automotive-Intensive Land Uses," Watershed 96. If one meter of rain per year falls on a street 10 meters wide, then at that observed mean rate, the annual runoff from each kilometer of street will contain about 275 liters of hydrocarbons. Moreover, other studies of non-point-source pollution have measured oil concentrations an order of magnitude higher at some locations. Spills can increase the volume of oil even more.

The result of such problems include enormous annual costs, both financial and environmental, by contaminating natural receiving waters.

Some known systems use a screen-type filter through which the water runoff passes. However, such systems are prone to becoming clogged with debris, thereby blocking the inlet to the storm drain. Also, such systems can collect only limited quantities of oil.

Other known systems use oil-absorbing materials, particularly cellulose-based ones, that can collect oil. However, those materials permit leaching of the absorbed oil back into the runoff water, because the absorbed oil is not encapsulated in the oil-absorbent material. In addition, those materials typically have small pores, creating a blocking effect that prevents long-term effectiveness in absorbing oil and limits the quantity of water runoff that can be passed through the material.

Other known systems are available for screening of oil runoff below grates, as in catchbasins. However, such systems are not suitable for the large number of curb-inlet storm drains that are installed already, and are continuing to be installed. Curb-inlet storm drains are used widely over catchbasins, in part because they suffer from fewer problems arising from the presence of standing water and residue sediments that are endemic to storm drains, and in part because they can handle high peak flows, such as during flash floods. Systems designed for screening oil runoff below grates or in catchbasins, therefore, are not generally suited to handle the problem of screening oil runoff into curb-inlet storm drains.

There has been a need for some time for trash and oil recovery systems for a curb inlet that would (1) contain oil quickly and permanently, (2) collect debris, (3) permit removal of trash and oil for disposal, and (4) permit collection over a long term and despite high peak flows.

Accordingly, it is a primary object of the present invention to achieve a more effective system for recovering trash and oil from water passing into curb-inlet storm drains or the like.

It is another object of the invention to provide an apparatus for effectively containing oil spills flowing into curb-inlet storm drains, over a wide range of flow rates.

It is another object of the invention to provide an apparatus for ameliorating oil spills by entrapping the oil in an oil-sorbent material.

It is another object of the invention to provide a means of improving the collection of spilled oil.

It is another object of the invention to provide collection systems that handle debris.

The present invention achieves the above and other objectives by use of a modular insert for curb-inlet storm drains having a composite collection system for trash and for oil or other hydrocarbons and related chemicals. A hopper contains a multitude of irregular, macroscopic fragments of a hydrophobic, compliant, oil-absorbent, copolymer material having high surface area. Preferably, the material is formed with a binder in a novel extrusion process. The fragments absorb and retain permanently a high quantity of oil and other chemicals passing through the hopper, while permitting a high water flow-through rate. The fragments are held in place by a removable bottom plate, which allows replacement of the filtering fragments, and an internal basket. Trash and debris are collected in the internal basket. The hopper is configured to be suspended in a storm drain adjacent to a curb inlet on a bracket and can be installed or serviced through a conventional manhole entry.

Other aspects of the invention will be appreciated by those skilled in the art after a reading of the detailed disclosure of the present invention below.

BRIEF DESCRIPTION OF THE DRAWINGS

Common numerals are used in the several figures to indicate similar elements.

DETAILED DESCRIPTION

The system includes the use of a quantity of appropriately formed fragments comprising copolymer-based materials that absorb and entrap crude or refined hydrocarbon products, including crude oil of any viscosity and gasoline or other refined fuels. For purposes of this application, the term "oil" refers to any hydrocarbon material. The materials can also absorb a variety of chemicals pollutants, such as benzene, carbon disulfide, and various chlorinated hydrocarbons.

Figure 1:
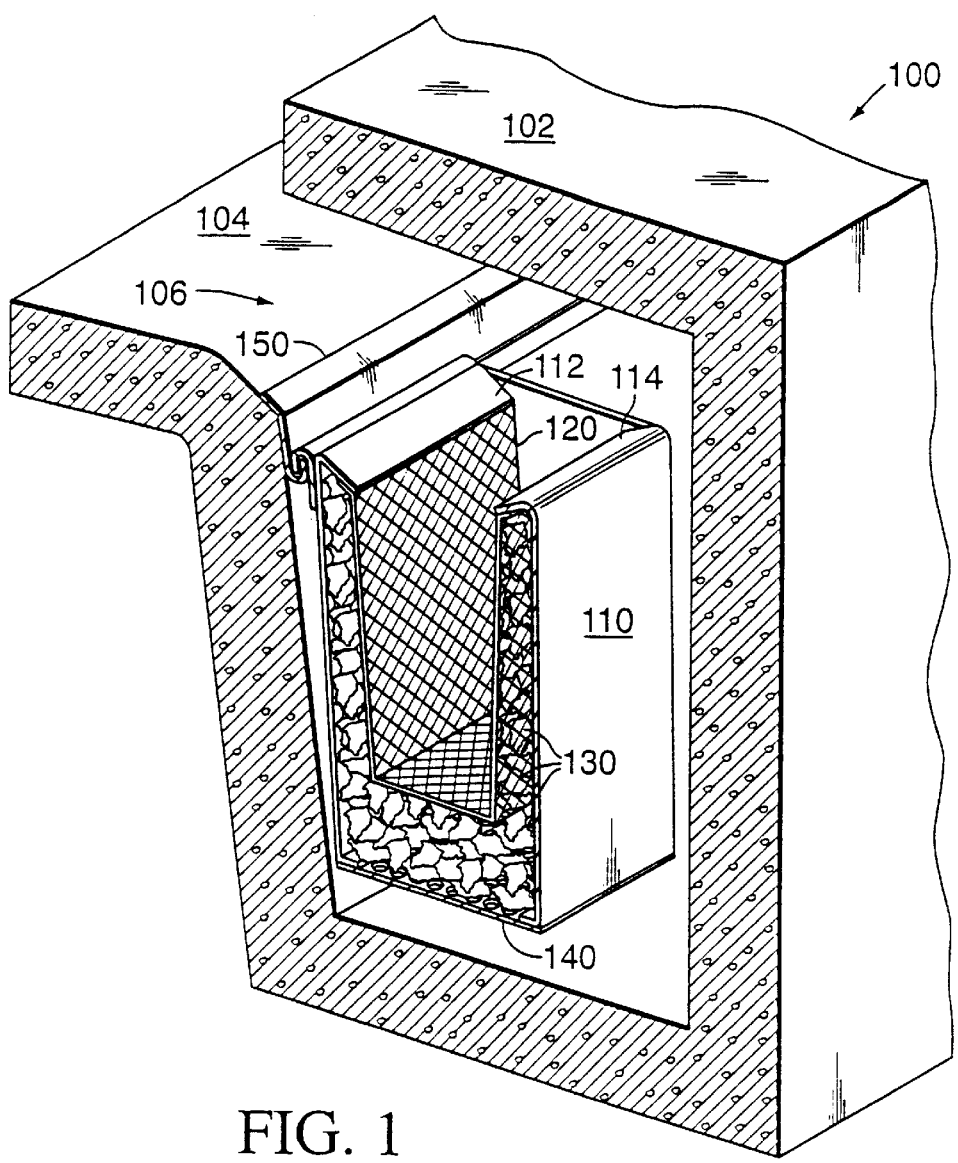
FIG. 1 is a perspective, cut-away view of a curb-inlet storm drain with an embodiment of the inventive system installed.

The inventive system is designed to collect trash and oil or other pollutants spilled and flowing into a fluid receptacle such as curb-inlet storm drain 100 shown in FIG. 1. Storm drain 100 can be part of a municipal sewer or waste water system or any private collection system, such as at a gas station.

Frequently, as shown in FIG. 1, storm drain 100 is of a sort placed under sidewalk 102 at the margin of street or roadway 104. A grate (not shown) of vertical slats or bars may be placed in the gap 106 in the curb (not shown) connecting sidewalk 102 and the gutter of street 104.

In the inventive system shown in FIG. 1, a flow consisting of water, pollutants, and trash (less larger trash items screened by the optional grate) enters storm drain 100 and falls into hopper 110. Basket 120 screens trash remaining in the flow. As trash accumulates in basket 120, the trash items thereby collected act as a secondary screen for new items in the mixed flow. Basket 120 is formed, in one embodiment, of non-corrosive expanded metal (steel) with diamond-shaped holes approximately 0.5×1.0 mm. in size. Basket 120 is secured, such as by welding, to front lip 112 and back lip 114 of hopper 110.

A multitude of fragments 130, of a type discussed below, are held between the outside of basket 120 and the inside of hopper 110. The fragments 130 are irregularly shaped, and not closely packed, allowing the liquid runoff to flow through hopper 110 at a high rate relative to cellulose or other known systems. The fragments 130 are hydrophobic but absorb and hold oil and chemical pollutants, as explained in more detail below, and thereby extract those undesired materials from the storm flow.

Figure 5:
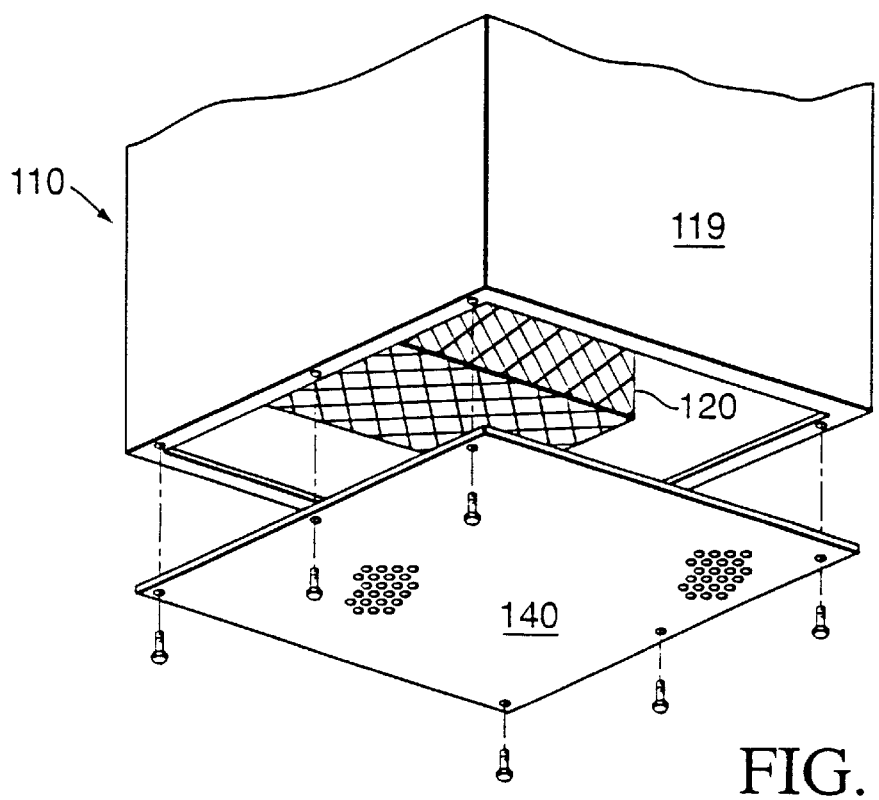
FIG. 5 is a bottom perspective view of the inventive hoppers shown in FIGS. 1, 2, or 3.

After passing through fragments 130, the runoff exits hopper 110 through a perforated steel bottom 140, shown in more detail in connection with FIG. 5, and proceeds through the storm drain and into the sewer or other water-collection or outlet system.

Hopper 110 is removable from storm drain 100. In the embodiment shown, hopper 110 hangs from a bracket 150 fastened to the side of storm drain 100, such as just below curb inlet 106. All elements of the hopper 110 are preferably manufactured of a noncorrosive material such as steel or other metals or high-density plastics.

Figure 2:
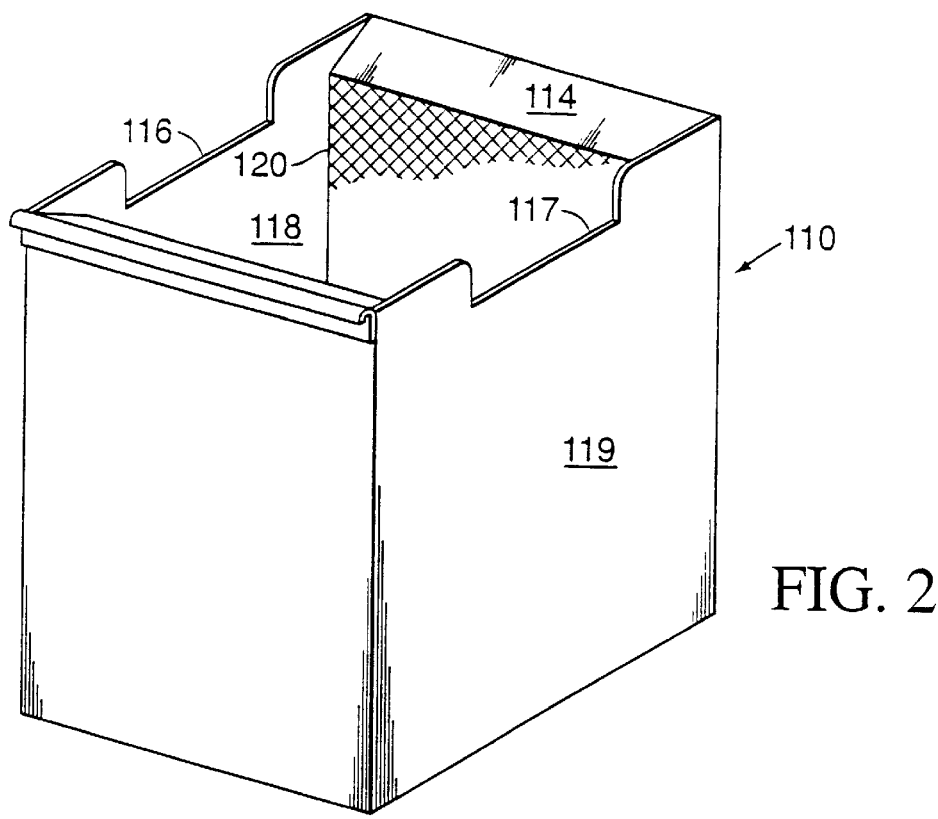
FIG. 2 is a perspective view of a central hopper module of an embodiment of the inventive system.
Figure 3:
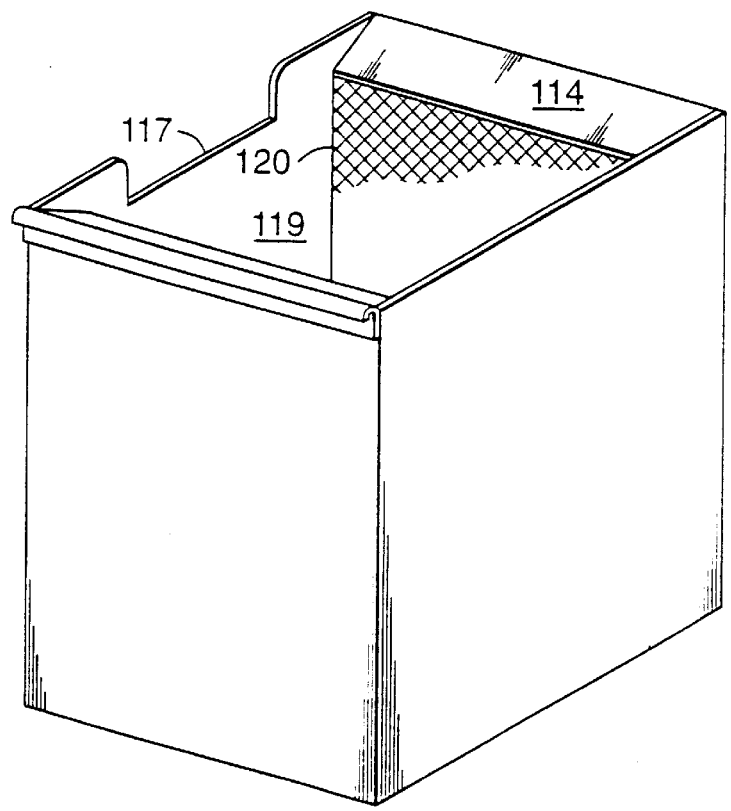
FIG. 3 is a perspective view of an end hopper module of the embodiment shown in FIG. 2.

A modular embodiment of hopper 110 is shown in FIGS. 2 and 3. FIG. 2 shows a central module, with cutouts 116, 117 near the top of side walls 118, 119. In this embodiment, basket 120 does not extend parallel to and inside side walls 118, 119, but rather terminates at the side walls. The central hopper of FIG. 2 is placed directly under the curb inlet.

FIG. 3 shows a side module, with a matching cutout 117 near the top of matching side wall 119. When side walls 119 of the central and side modules shown in FIGS. 2 and 3 are placed together, cutouts 117 match as well.

Although the side module of FIG. 3 is shown as adjoining wall 119, it should be apparent without need for illustration that an opposite side module can adjoin wall 118 on the other side of the central module of FIG. 2.

Figure 4:
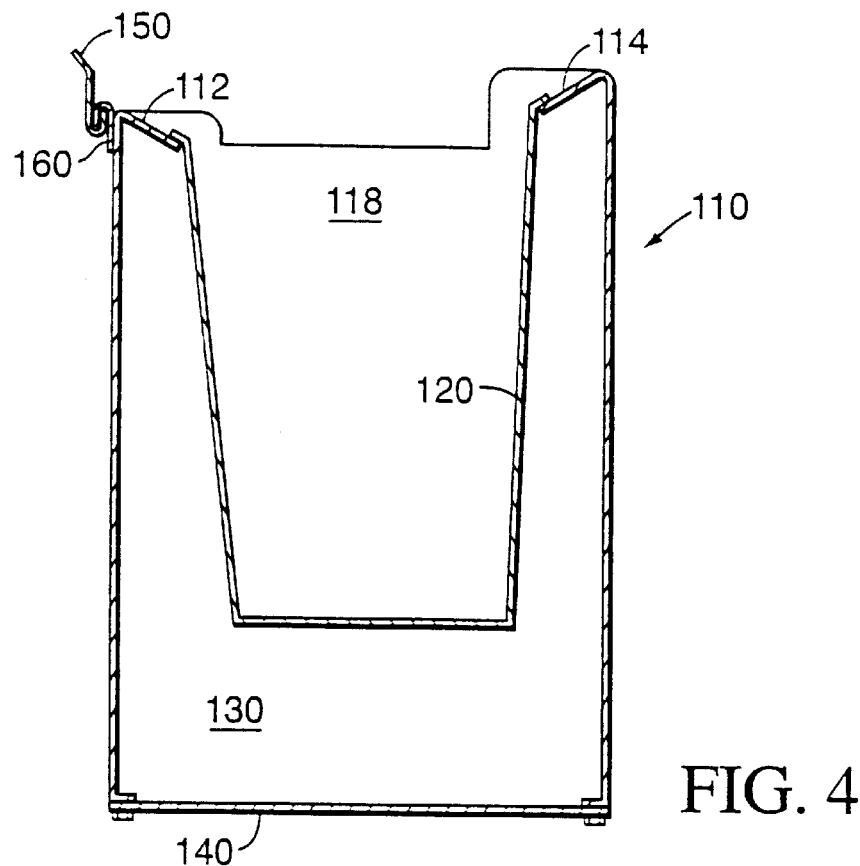
FIG. 4 is a cross-sectional side view of the inventive hoppers shown in FIGS. 2 or 3.

FIG. 4 shows a cross-sectional view of hopper 110, of the sort shown in FIGS. 2 or 3, with cutout 116 shown on the top end of side wall 118. FIG. 4 shows an elongated hook 160 fastened to the front wall of hopper 110 (in an alternative embodiment not shown, hook 160 can be formed integrally with the front wall), which engages bracket 150. In this fashion, each module can be individually handled for installation or servicing.

The modular design of this embodiment permits more effective screening even in high-flow situations. The geometry of the inventive hopper 110 is such that the flow-through rate is constrained by the smallest of (1) the area of perforations in bottom plate 140, (2) the flow-through rate of fragments 130, (3) the area of the holes in basket 120, or (4) the flow-through rate of trash accumulated in basket 120. However hopper 110 is dimensioned, there will be times when runoff is at a high enough level to exceed the flow-through rate of hopper 110. In that situation, the water level in basket 120 will quickly rise.

In the modular embodiment shown in FIGS. 2–4, when the water level reaches the bottom of cutouts 116, 117, water and smaller, lighter trash items will overflow into the adjoining basket instead of falling into the storm drain itself. This arrangement hinders the possibility of collected trash being washed out of the collection basket 120, and it will help screen more of the flow into the curb-inlet storm drain.

It should be apparent to one of ordinary skill in the art that any number of modules of the sort shown in FIGS. 2 and 3 can be arranged in a row. The side module of FIG. 3 is used for the end of a row, while an arbitrary number of central modules of FIG. 2 are used at all places other than the end of a row.

The modules can extend even beyond the left or right end of curb inlet 106, subject of course to the proviso that there is space in the storm drain, as it is not necessary that water flow directly into each of the hoppers 110 of each of the modules in a row. Rather, extra modules can be used at the end of a row to increase the capacity of the system to handle higher flow rates.

The relative dimensions of the cutouts 116,117 can be altered to adjust the flow rate at which overflow will occur. In an environment in which high flow levels are encountered often, it may be desired to lower the height of the bottom of cutouts 116, 117, to spread the incoming flow laterally along the row of modules when the flow exceeds a relatively low flow rate, thereby minimizing the chance that water will overflow the row of hoppers 110 and pass directly into the storm drain 100. In an environment in which high flow levels are encountered less frequently, by contrast, it may be desired to keep the bottom of cutouts 116, 117 relatively high, to avoid the necessity to change the filter media in the side modules frequently.

During storms surges or at other high-flow times, the flow through curb inlet 106 will be moving fast enough that much of the storm water will flow over hopper 110 and pass directly into storm drain 100. This is not undesirable, however, because such bypass reduces the chance of damage to the equipment. The force of the runoff during high-flow times is so powerful that equipment damage would likely result from any attempt to screen the water. In addition, in real-world weather conditions, the flow rate usually builds up somewhat gradually, and the earlier, lower-flow water is likely to wash away a high proportion of the pollutants that can be carried into the storm drain. Thus, little additional oil or trash will be included in the main part of a storm surge. In any event, any such additional pollutants, which are washed away only by high-flow water, will be highly diluted in the extra water of a storm surge. Thus, screening excess water at the highest flow rates is not worth the effort.

At high flow rates, runoff passes from street 104 through curb inlet 106 (see FIG. 1) so quickly that the water enters storm drain 100 nearly horizontally, largely overflowing back lip 114 of hopper 110. Back lip 114 is preferably designed with a slope (as best shown in FIG. 4), so that high-speed water splashing against lip 114 at high flow rates will put a downward and clockwise force on hopper 110, which will press the lower front end of hopper 110 against the wall of storm drain 100 and maintain a firm connection of hook 160 and bracket 150. If back lip 114 were not so designed, the buffeting from high-pressure water directed against a flat inside back side of basket 120 could wash away some of the fragments 130 behind the screen of basket 120 and in extreme cases could cause hook 160 to disengage from bracket 150. An optional rubber or plastic spacer or bumper can be secured to the lower part of the front side of the hopper 110, to retain hopper 110 in a vertical position against the wall of the storm drain extending down from curb inlet 106.

In a preferred embodiment, hopper 110 is rectangular, measuring about 60cm. high at the back (below lip 114), 35 cm. wide, and about 40 cm. deep. A hopper 110 so dimensioned holds about 8 kg. of oil-absorbent fragments 130 of the sort described below. Back lip 114 is set at a height slightly above front lip 112 and about equal to the bend in bracket 150.

Although FIGS. 1–4 show a generally rectangular hopper 110, other configurations are also possible. Hopper 110 can be sized to fit a particular catchbasin. Alternatively, hopper 110 can be made in various widths, to accommodate different curb inlets 106. In a the modular embodiment shown in FIGS. 2 and 3, however, such variety is not necessary.

FIG. 5 shows bottom plate 140, which in the embodiment shown is removably fastened to hopper 110. A multitude of round holes about 3 mm. across (only some of which are shown in the figure) allow water to pass through bottom plate 140.

From time to time, fragments 130 can become oil-logged and it is desired to replace that oil-absorbent material with another quantity of new material. With the material discussed below, in the exemplary dimensions discussed, and with normal runoff levels, such replacement is expected to occur on the order of once a year or so. In addition, hopper 110 can be removed more frequently for the purpose of emptying trash basket 120, without the need to replace fragments 130 each time.

During servicing, hopper 110 is lifted from bracket 150 from inside storm drain 100 and removed from storm drain 100 through a manhole. Hopper 110 is dimensioned in the preferred embodiment to fit through a standard manhole. One or more handles 144 can be optionally fastened to hopper 110, to assist in easy installation and servicing.

Horizontal diffuser plates (not shown) can optionally be placed between layers of fragments 130. Such plates can be formed of plastic, for example, and contain a multitude of holes or small slits. The purpose of a diffuser plate is to defeat the propensity of the liquid flowing through hopper 110 to collect in channels. The formation of channels is undesirable because much of the liquid in a channel will come into contact only with those of the fragments 130 that have previously absorbed oil.

When oil-water runoff passes through curb inlet 106 and comes into contact with the copolymer material of fragments 130 contained inside hopper 110, the copolymer material will absorb and entrap the oil. Because the copolymer material is hydrophobic, however, it will not become waterlogged, and excess water will pass into storm drain 100. After suitable copolymer material has absorbed oil, subsequent runoff flowing therepast will not wash away the oil. Indeed, it has been found that the materials described herein can remain in contact with water continuously for at least several months, and perhaps indefinitely, without releasing the oil or allowing oil to emulsify.

Figure 6:
FIG. 6 is an outline of a sample copolymer fragment used in the inventive hoppers shown in FIGS. 1, 2, or 3.

FIG. 6 shows an example of a suitably formed copolymer fragment 130, for use inside hopper 110. The principal ingredient of fragment 130 is a copolymeric material that is known to sorb oil but not water. Preferably, the material is compliant or flexible.

As oil enters fragments 130, they expand somewhat. Thus, it is preferred to avoid filling hopper 110 completely with fragment 130, to prevent fragment 130 from pushing upwards into basket 120 as they expand.

Particularly suitable types of copolymers fall within the class of thermoplastic elastomers, such as styrene-butadiene-styrene ("SBS"), which is a styrenic block copolymer. Styrenic block copolymers were developed for applications that require impact resistance, and this is still their primary use. SBS is highly sorbent, non-toxic, and remains coherent after it is oil saturated. An alternative styrenic block copolymer is styrene-isoprene-styrene ("SIS").

In a preferred embodiment formed in accordance with the preferred process described below, SBS material formed into granules is mixed with granulated binder material. In that embodiment, granular porous SBS with about 30% styrene has been found suitable, when sifted to retain particles in the range of sizes between 4 and 24 mesh. Preferably, the SBS product is manufactured without talc, contrary to the standard manufacturing process, to enhance inter-granular linking or bonding in the formed body.

The binder material is a compliant or flexible, hydrophobic, olefinic polymer material in a granular form and having a melting point lower than that of the oil-absorbent copolymer. Polyolefin thermoplastic elastomers, such as ethylene propylene ("EP") rubber or ethylene propylene with a diene monomer ("EPDM") have been found suitable. The binder largely prevents fragments 130 from crumbling while being handled in dry form, yet also absorbs a certain quantity of oil. In a preferred embodiment, EPDM granules sifted to retain particles between 12 and 24 mesh were found suitable.

About 70–90% by weight of the material of fragments 130 consists of SBS and the remainder of EPDM binder. As explained below, SBS and EPDM granules are mixed and formed into fragments 130 in a way that results in SBS granules in an EPDM matrix.

The fragments 130 are irregularly shaped and not in powder form, preventing them from being too compactly packed inside hopper 110, because that may restrict the flow of water. The random shapes also move the liquid laterally in hopper 110, thereby further reducing the tendency of the liquid to collect into channels.

To permit faster oil absorption and less gel blocking (a phenomenon in which a layer of absorbed oil at the exterior blocking access to inner portions of fragments 130), without increasing the distance from surface to center, it is desirable to avoid smooth exterior "skins" on outer surfaces of fragments 130. The preferred process of formation discussed below promotes this goal.

Figure 7:
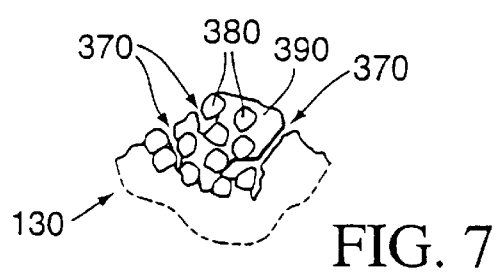
FIG. 7 is a detail view of a section through a fragment such as the one shown in FIG. 6.

Also to reduce gel blocking, fragments 130 preferably have numerous fissures 370 extending into them from exterior surfaces and passing between the grains of SBS, as illustrated in FIG. 7. Such fissures increase the effective surface area of fragments 130 while still maintaining each as a coherent whole, permitting easy handling. The preferred formation process discussed below promotes this goal.

In one example, fragments 130 consisted primarily of irregularly shaped objects with various dimensions about a centimeter or two across. Those fragments 130 were formed, of 78% SBS and 22% EPDM and had a bulk density of about 0.6 g/cc and mostly weighed about 2 to 3 grams each. Some of the fragments had broken into smaller pieces, some of which weighed as little as 0.3 to 1 grams. A few fragments consisted of pairs of normally sized fragments that had linked together, forming larger fragments about 5 to 6 grams each.

The bulk density of fragments 130 is controlled, also to reduce gel blocking. With the preferred bulk density, the SBS granules in fragments 130 are also less likely to clump to each other when soaked with oil, which also improves sorbency. Similarly, the SBS grain sizes identified above are selected to avoid gel blocking from either overly large chunks or agglomerated small-diameter, powdery particles.

With the preferred materials discussed above, bulk density greater than 0.75 g/cc tend to prevent the oil from entering the fragments, while bulk density smaller than 0.35 g/cc cause the fragments to fragment more easily, either when dry or after absorbing oil. For example, copolymer fragments 130 with a bulk density in the preferred range have enough inter-granular voids to permit oil to penetrate substantially throughout the thickness of the larger fragments 130, thereby avoiding gel blocking, while leaving them mostly intact. Fragments of such material can absorb up to five times their weight in oil.

One method of forming fragments 130 applies a modified extrusion process. SBS and EPDM granules are placed in the hopper of an extruder of conventional design, for example, a two-inch Bonnot lab extruder with a hot-water external barrel heater. The extruder heats the granular material to a temperature not exceeding 120° F., far below normal extrusion temperatures for plastic products, and preferably about 105° F.

In the barrel of the extruder, the EPDM quickly become softened, as a result of heat, pressure, and mechanical agitation by the screw and barrel in combination. The extruder's screw mixes the softened EPDM and the SBS, forming a matrix of EPDM surrounding and interlinked to SBS granules. Because the SBS is not melted, some air bubbles remain in the mixture. The softening process occurs quite rapidly in the extruder, permitting very short dwell times (such as less than one minute), which permits rapid manufacturing.

The composite material is pressed through a circular die with a central rod or mandrel, at a flow rate of about 6 g/sec., which if left undisturbed would form a cylindrical body with an axial hole. However, radial arms at the end of the die, or a similarly configured cutter just outside the nozzle, section the cylindrical bodies into segments, perhaps four sections. An automatic knife fires every two seconds or so, cutting off lengths of the sections.

In another embodiment of the process, a spider (used inside the extruder just before the die to stop rotation of the material) cuts the material, and the extruder is run at a higher speed, resulting in a flow rate of about 10 g/sec., sufficiently large to prevent the material from mixing back together after passing through the spider. Thus, the spider serves the additional purpose of cutting the material. In this embodiment, the knife speed is increased to about once a second, to correspond.

Another way of producing such fragments is to use a smaller die, with a hole approximately one centimeter across, to produce the fragments directly rather than by cutting them radially from a cylindrical form.

Upon passing through the die, the SBS granules, which have been compressed somewhat by being forced through the die, re-expand, "fluffing" the extruded material while it slowly cools. The expansion is further assisted by air remaining in the mixture. After the extruded material is cut into suitable lengths, it slowly cools outside the extruder, and the granules continue to expand for a time, causing additional fluffing.

The EPDM matrix 390 (see FIG. 7) forms a durable but permeable structure for the SBS granules 380 and provides mechanical integrity to resulting fragments 130. Thus, fragments 130 formed in accordance with the preferred method resist breaking or cracking absent extreme elastic deformation, despite the presence of fissures 370. Also, fragments of such bodies do not detach easily in the form of flakes, crumbles, or dust, even with rough handling.

The fluffing effect (typically undesired in extrusion processes) is beneficial because it forms inter-granular fissures 370 in the EPDM matrix, throughout the structure. However, the fissuring is not so great as to cause loss of structural integrity. As noted above, fissures are preferred to facilitate rapid passage of oil into fragments 130 and to reduce the incidence of gel blocking, permitting continued absorption.

Slight irregularities in the flow rate, the fluffing effect, and the way in which the knife cuts the material can cause fragments of different sizes to form. For example, a larger-than-normal fragment can be formed when two adjacent sections link together. A smaller-than-normal fragment can be formed when a section breaks apart if fissuring caused by fluffing happens to occur along a fracture line.

The resulting fragments 130 are similar in size and general appearance to popcorn. About 3,000 of the fragments would fill the hopper 110 of example dimensions discussed above.

Although the invention has been described with reference to specific embodiments, many modifications and variations of such embodiments can be made without departing from the innovative concepts disclosed. Thus, it is understood by those skilled in the art that alternative forms and embodiments of the invention can be devised without departing from its spirit and scope.

We claim:

1. A modular insert for storm drains for collecting trash and absorbing oil or chemicals comprising:
   (a) a hopper having a perforated bottom plate and side walls;
   (b) a basket inside the hopper;
   (c) wherein there is a space for a quantity of oil-sorbent material in the hopper and between the hopper and the basket;
   (d) wherein the hopper has a cutout at the top end of at least one of the side walls.

2. The modular insert of claim 1 wherein the bottom plate is removable from the hopper.

3. The modular insert of claim 1 wherein the basket is comprised of expanded metal forming diamond-shaped holes.

4. The modular insert of claim 1 wherein the hopper is rectangular in cross-section.

5. The apparatus of claim 4 further comprising a bracket coupled to the outside of the top end of a side wall of the hopper.

6. The apparatus of claim 5 further comprising a lip at the top end of that side wall opposite to the bracket, which lip has an upper surface that is sloped relative to the top of the hopper.

7. The apparatus of claim 6 further comprising a bumper at the bottom of the side wall to which the bracket is coupled.

8. The apparatus of claim 7 wherein the bottom plate is removable from the hopper and wherein the basket is comprised of expanded metal forming diamond-shaped holes.

9. The apparatus of claim 8 further comprising a horizontal diffuser plate in the hopper separating some of the multitude of fragments from the remainder of the multitude.

10. The apparatus of claim 1 further comprising a horizontal diffuser plate in the hopper separating some of the multitude of fragments from the remainder of the multitude.

11. A modular insert system for curb-inlet storm drains for collecting trash and absorbing oil or chemicals comprising:
   (a) a plurality of hoppers, each hopper having:
      (i) a perforated, rectangular bottom plate and side walls perpendicular to each edge of the bottom plate; and
      (ii) a basket inside the hopper;
      (iii) wherein there is a space for a quantity of oil-sorbent material in the hopper and between the hopper and the basket;
   (b) wherein at least two of the hoppers have matching cutouts at the top is end of adjacent side walls.

12. The system of claim 11 wherein there are at least three hoppers, two of which have cutouts at the top end of only one side wall and a third of which has cutouts at the top end of opposing side walls.

13. The system of claim 12:
   (a) wherein each hopper further has a bracket coupled to the outside of the top end of a side wall of the hopper;
   (b) wherein the cutouts of the third hopper are on different side walls from the side wall supporting the bracket;
   (c) wherein the cutouts of the two hoppers having only one cutout are on side walls adjacent to the respective side wall supporting the bracket; and
   (d) wherein the cutouts of the two hoppers having only one cutout are on opposite sides of the respective side walls supporting the bracket.

14. The system of claim 13 wherein, for each hopper, the bottom plate is removable, the basket is comprised of expanded metal forming diamond-shaped holes, and the hopper further comprises a lip at the top end of that side wall opposite to the bracket, which lip has an upper surface that is sloped relative to the top of the hopper.

* * * * *